US012633234B2

(12) United States Patent
Snedeker et al.

(10) Patent No.: US 12,633,234 B2
(45) **Date of Patent: *May 19, 2026**

(54) MAGNETIC STANDOFF SYSTEM

(71) Applicants: Scott Snedeker, Westminster, CA (US); Mark Vogt, Westminster, CA (US)

(72) Inventors: Scott Snedeker, Westminster, CA (US); Mark Vogt, Westminster, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 18/464,960

(22) Filed: Sep. 11, 2023

(65) Prior Publication Data

US 2024/0013684 A1 Jan. 11, 2024

Related U.S. Application Data

(63) Continuation-in-part of application No. 16/790,670, filed on Feb. 13, 2020, now Pat. No. 11,754,101.

(51) Int. Cl.
*F16B 1/00* (2006.01)
*G09F 7/18* (2006.01)

(52) U.S. Cl.
CPC ........ *G09F 7/18* (2013.01); *G09F 2007/1852* (2013.01)

(58) Field of Classification Search
CPC ................ F16B 1/00; F16B 2001/0035; F16B 2001/0064; F16B 5/00; G09F 13/00; H01F 7/0205
See application file for complete search history.

(56) References Cited

U.S. PATENT DOCUMENTS

| | | | | | |
|---|---|---|---|---|---|
| 5,472,163 | A * | 12/1995 | Callas | G09F 7/18 40/607.1 |
| 5,918,397 | A * | 7/1999 | Elmer | G09F 21/04 40/592 |
| 10,548,380 | B2 * | 2/2020 | Rayner | A45F 5/00 |
| 11,549,833 | B1 * | 1/2023 | Feijoo | G01D 11/305 |
| 2004/0065798 | A1 * | 4/2004 | Pitlor | H02G 3/20 248/342 |
| 2005/0045784 | A1 * | 3/2005 | Pitlor | H02G 3/20 248/206.5 |
| 2005/0253032 | A1 * | 11/2005 | Pitlor | H02G 3/20 248/206.5 |
| 2016/0003270 | A1 * | 1/2016 | Franklin | H01F 7/0221 439/529 |

FOREIGN PATENT DOCUMENTS

| | | | | |
|---|---|---|---|---|
| CN | 110719998 A * | 1/2020 | A42B 3/04 |
| DE | 29924599 U1 * | 3/2004 | F16B 12/00 |

* cited by examiner

*Primary Examiner* — Mohamad A Musleh
(74) *Attorney, Agent, or Firm* — RC Trademark Company

(57) ABSTRACT

According to some embodiments, a fastener is disclosed. The fastener comprises a first portion to be coupled to a wall, a second portion to be coupled to signage and a middle connector. The middle connector is coupled to the first portion and is also magnetically coupled to the second portion.

7 Claims, 9 Drawing Sheets

200

MAGNETIC STANDOFF SYSTEM

BACKGROUND

A conventional standoff is a separator of defined length used to raise one part in an assembly above another. Connecting signs to a wall using a conventional standoff requires that the sign be connected to the standoff and then the combination of the standoff and the sign is connected to the wall. When the sign is an illuminated sign, electrical wires are run from the wall to sign. The conventional method of hanging signs using a standoff is usually cumbersome and therefore it would be desirable to implement a system that makes it simpler to use a standoff for connecting a sign to wall.

SUMMARY

Some embodiments described herein relate to a fastener (e.g., a standoff). The fastener may comprise a first portion to be coupled to a wall, a second portion to be coupled to signage and a third portion that is a middle connector. The middle connector may be coupled to the first portion and may also be magnetically coupled to the second portion.

DETAILED DESCRIPTION

In the following detailed description, numerous specific details are set forth in order to provide a thorough understanding of the embodiments. However, it will be understood by those of ordinary skill in the art that the embodiments may be practiced without these specific details. In other instances, well-known methods, procedures, and components have not been described in detail so as not to obscure the embodiments.

The present embodiments described herein relate to a magnetic standoff system. In particular, the present embodiments relate a multi-part standoff system/fastener that allows power to be conducted directly through the standoff system instead of having to use both a standoff and separate wiring. The present embodiments may comprise a magnetic quick connect standoff system that may be utilized for both illuminated and non-illuminated signage where the signage may comprise a three-dimensional logo, one or more letters and/or any type of overlay.

Conventional creating of booths and displays at a tradeshow required the booth to be created onsite from scratch where the signage is wired and then hung up in the booth at the tradeshow. With limited time, this can lead to mistakes in building the booth and puts pressure on workers to create the booths within a limited amount of time. With the embodiments described herein, the booths and displays may be created offsite prior to the tradeshow and then shipped to a tradeshow where the booth is quickly assembled and the signage is already wired and configured to be hung. Moreover, due to the use of magnets, the fasteners described herein may be self-aligning which may allow for even faster assembly.

Figure 1:
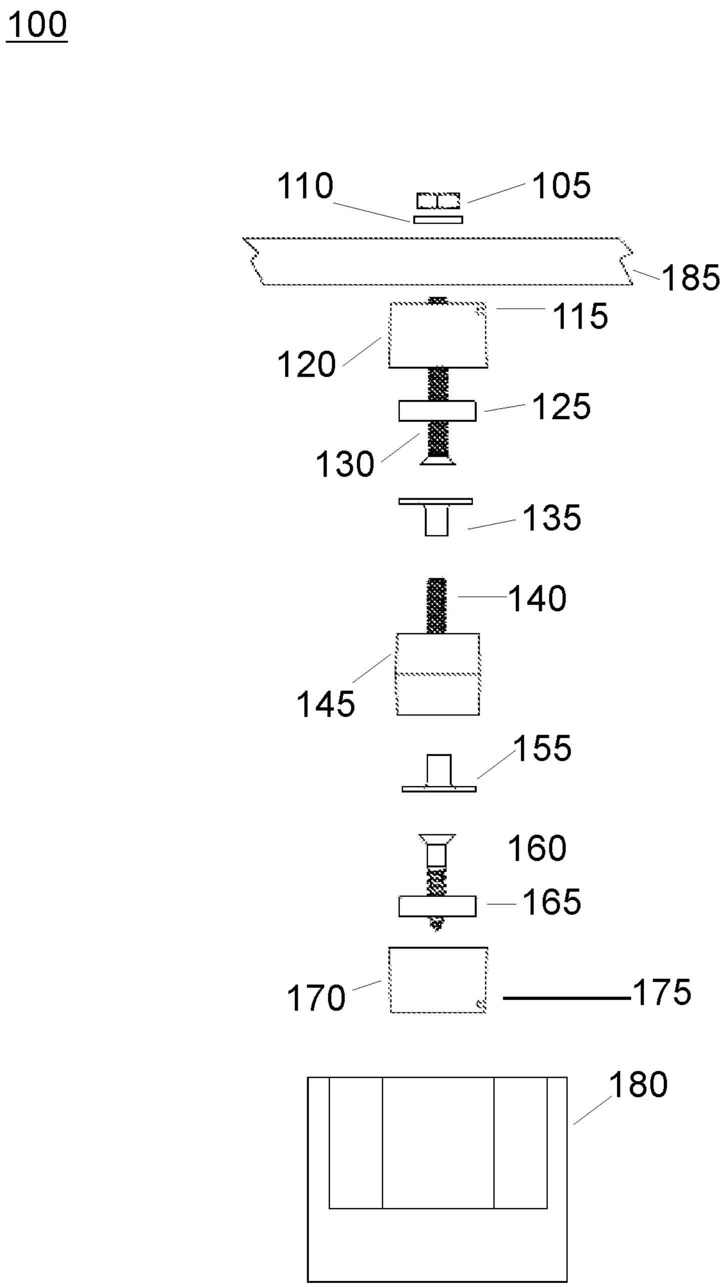
FIG. 1 illustrates a magnetic standoff system in accordance with some embodiments.

Referring now to FIG. 1, an embodiment of a fastener 100. The fastener 100 may function as a standoff. In some embodiments the fastener 100 may comprise a dimension of ⅜" diameter×1" height or ⅝" diameter×1" height.

The fastener 100 may comprise a nut 105, a washer 110, a solder tab 115, a first cup 120, a first magnet 125, a first rod 130, a first steel nut 135, a second rod 140, a standoff body 145, a second steel nut 155, a third rod 160, a second magnet 165, a second cup 170, and a solder tab 175. The first rod 130, the second rod 140 and the third rod 160 may be threaded or partially threaded. For example, the first rod 130, the second rod 140 and the third rod 160 may comprise a screw, bolt, rivet, partially threaded rod, an unthread rod or other type of fastener. In some embodiments, first rod 130, the second rod 140 and the third rod 160 may be comprised of metal.

Figure 4:
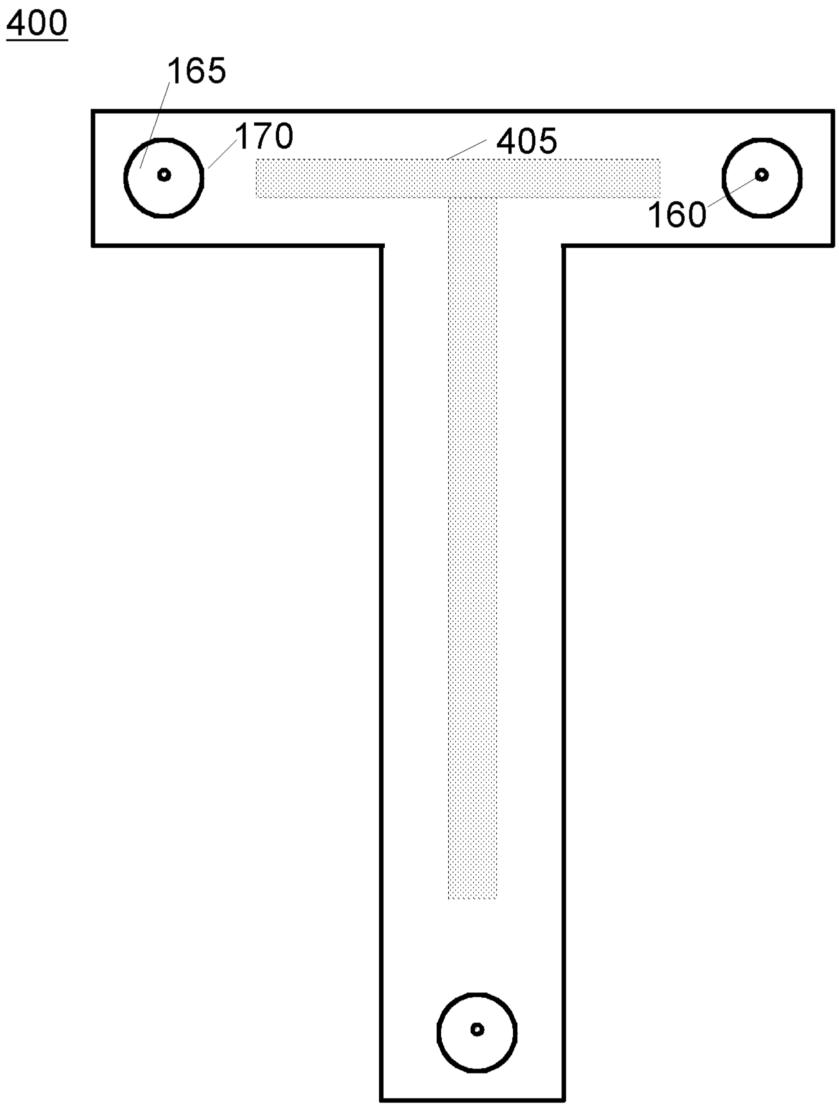
FIG. 4 illustrates a portion of a magnetic standoff system attached to a sign in accordance with some embodiments.

For illustrative purposes, and to aid in understanding features of the specification, an example will now be introduced. This example is not intended to limit the scope of the claims. In some embodiments, a booth at a tradeshow may require a lighted sign 180 to be placed in the booth where the sign is connected to a wall 185 (e.g., a physical wall or some form of paneling or backing board). In this example, it is assumed that the wall has accessible electrical wiring. Referring now to FIG. 4, an embodiment of a sign 400 is illustrated. The sign 400 in the present example is simply a letter T. Molded cups 170 with magnets 165 (e.g., disc magnets) inserted into the cups 170 are each attached to the sign 400 by rod 160 (e.g., a screw, rivet or other type fastener). One or more of the rods 160 may be electrically coupled to lighting 405 such that when electrically is received at the magnet 165, the electricity flows through the magnet to the screw 160 and to the lighting 405.

Figure 5:
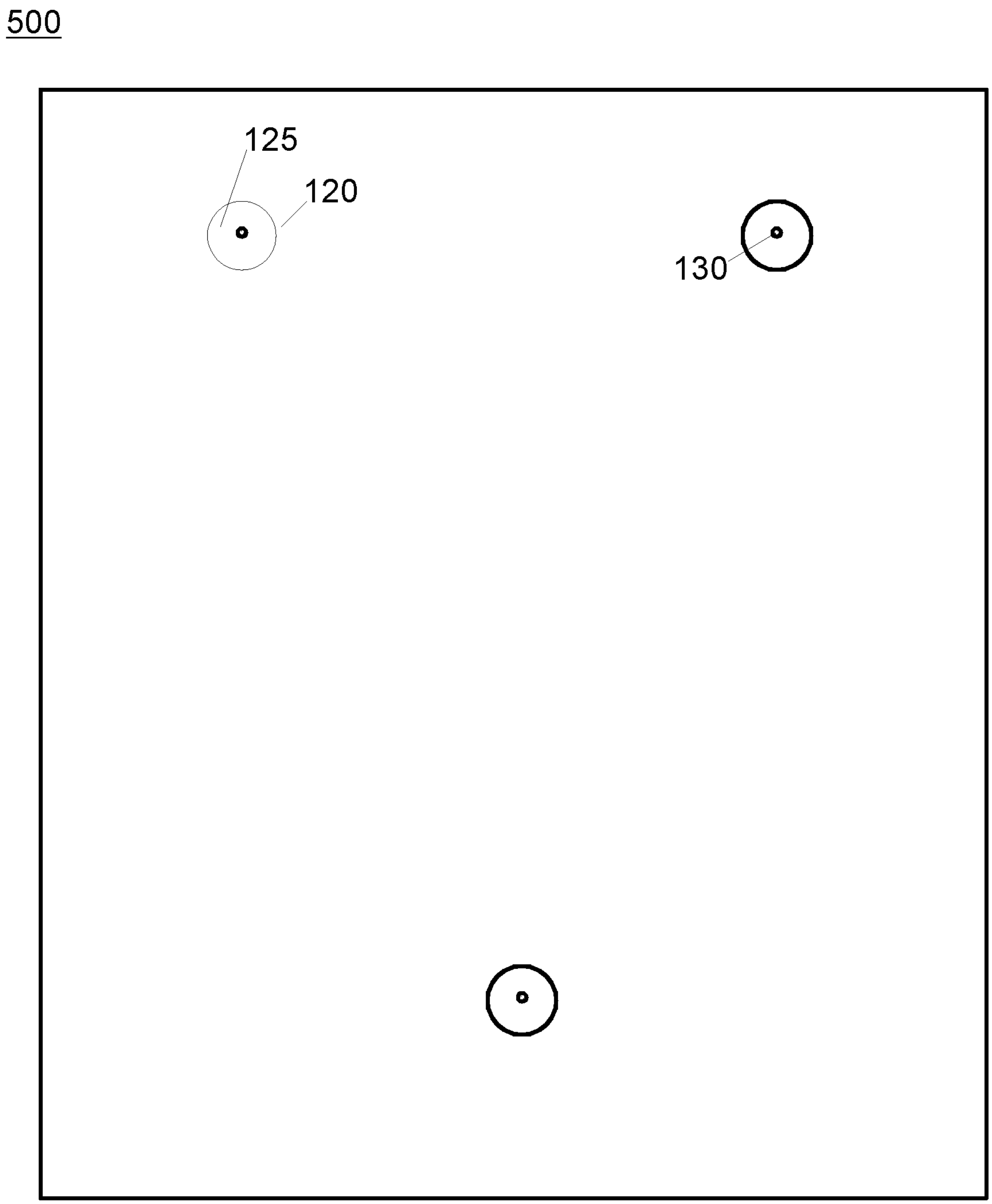
FIG. 5 illustrates a portion of a magnetic standoff system attached to a sign in accordance with some embodiments.

Referring back to FIG. 1, to connect a sign 180 to a wall 185, the first cup 120 may be coupled to the wall 185 via rod 130 such as, but not limited to, a screw, bolt, rivet, partially threaded rod, an unthread rod or other type of fastener. Continuing with the above example, and now referring to FIG. 5, a portion of a wall 500 is illustrated. As illustrated in FIG. 5, the first cup 120 may be attached to the wall 500 via rod 130 such as, but not limited to, a screw, bolt, rivet, partially threaded rod, an unthread rod or other type of fastener. In some embodiments, a nut 105 and a washer 110 may also be used to secure the first cup 120 to the wall 500. In a case where power is required to be provided to power lighting associated with a sign, the first cup 120 may be electrically coupled to existing power via the solder tab 115. In some embodiments the existing power may be electrically coupled to a fastener such as, but not limited to, a screw 130. The first cup 120 may comprise the first magnet 125 which may, in some embodiments, comprise a disc magnet that is press fitted into the first cup 120 so that the disc magnet is secure within the first cup 120.

Figure 6:
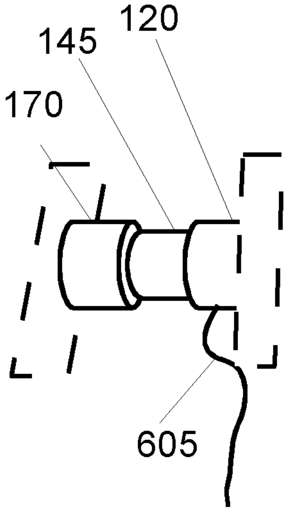
FIG. 6 illustrates a portion of a magnetic standoff system attached to a sign and a wall in accordance with some embodiments.

To couple the first cup 120 to the second cup 170, a standoff body 145 may be inserted between the first cup 120 and the second cup 170. In other words, a first side of the standoff body 145 may be inserted into the first cup 120 and a second side of the standoff body 145 may be inserted into the second cup 170. The standoff body 145 may comprise metallic or magnetic ends, such as, but not limited to steel nuts 135/155, to create a magnetic connection with the first cup 120 and the second cup 170. The magnetic connection not only holds the first cup 120 and the second cup 170 to the standoff body 145 but it may also electrically couple the first cup 120 to the second cup 170. In other words, power supplied at the first cup 120 may be transmitted through the standoff body 145 to the second cup 170. For example, and as illustrated in FIG. 6, the first cup 120 may be electrically coupled to a power cable 605. The standoff body 145 may be inserted into the first cup 120 and may be magnetically held in place. The signage coupled to the second cup 170 may then be electrically coupled to the power cable 605 by inserting the standoff body 145 into the second cup 170.

Figure 2:
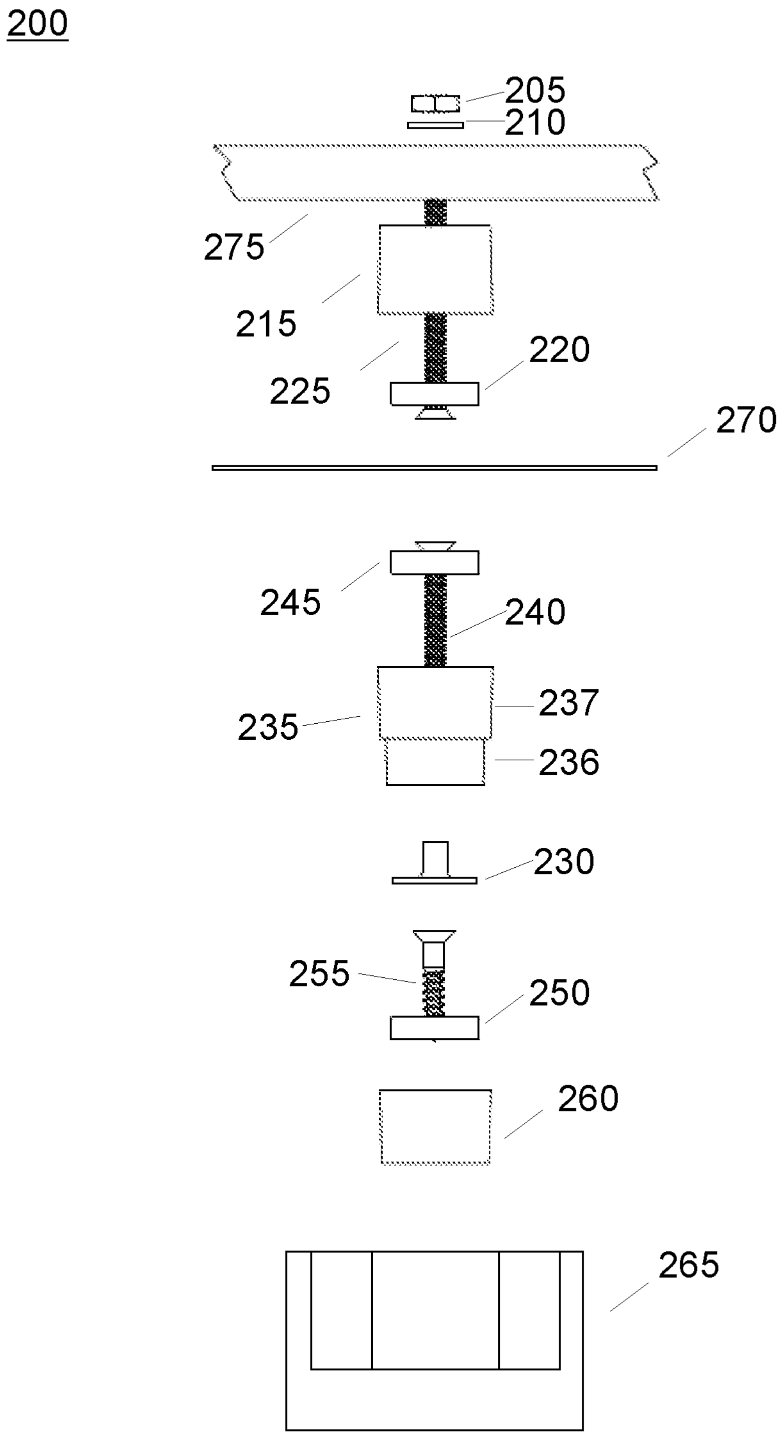
FIG. 2 illustrates a magnetic standoff system in accordance with some embodiments.

Referring back to FIG. 2, an embodiment of a fastener 200 is illustrated. The fastener 200 may function as a standoff similarly to the fastener 100 of FIG. 1. However, in the present embodiment, the fastener 200 be used over a cloth 270 or fabric covered wall 275. The fastener 200 may comprise a nut 205, a washer 210, a first cup 215, a first magnet 220, a first rod 225, a first nut 230, a standoff body 235 comprising a first portion 236 and a second portion 237, a second rod 240, a second magnet 245, a third magnet 250, a third rod 255, and a third body 260.

The fastener 200 may differ from the fastener 100 in that the standoff body 235 comprises a first portion 236 and a second portion 237 where the first portion comprise a first radius and the second portion 237 comprises a second radius and where the first radius is smaller than the second radius. Another difference between fastener 100 and fastener 200 is that the standoff body 235 may not be inserted into the first cup 215 but may simply be magnetically coupled to the first cup 215 with the cloth 270 disposed between a contact point on the standoff body 235 and a contact point on the first cup 215. In some embodiments, a contact point may comprise a flat surface such as, but not limited to, a disc magnet or a flat portion of a cup or a standoff body.

As stated above, in the present embodiment, the fastener 200 be used over a cloth 270 or fabric covered wall. In some embodiments, the cloth 270 covered wall 275 may comprise a fabric with graphics called Silicon Edge Graphic ("SEG") that is secured to a hard portion of the wall via silicon edges. The cloth covered wall may define a space between the cloth and a rigid portion of the wall. In this defined space, the first cup 215 maybe secured to the rigid portion of the wall and the first cup 215 may be covered by the cloth 270 so that the first cup 215 is not visible when exhibitors at the trade show look at the cloth covered wall. In use, when the standoff body 235 is placed near the first cup 215, the first cup 215 and the standoff body 235 may automatically align due to the use of one or more magnets in the standoff body 235 and/or the first cup 215. The standoff body 235 may be aligned and secured to the first cup 215. In this embodiment, it may be advantageous to use a larger magnet when cloth is disposed between a contact point on the standoff body 235 and a contact point on the first cup 215. Thus, in some embodiments, the standoff body 235 comprises a first portion 236 and a second portion 237 where the first portion comprise a first radius and the second portion 237 comprises a second radius and where the first radius is smaller than the second radius. This may allow for greater magnetic adhesion to connect a sign 265 to the cloth 270 covered wall.

Figure 3:
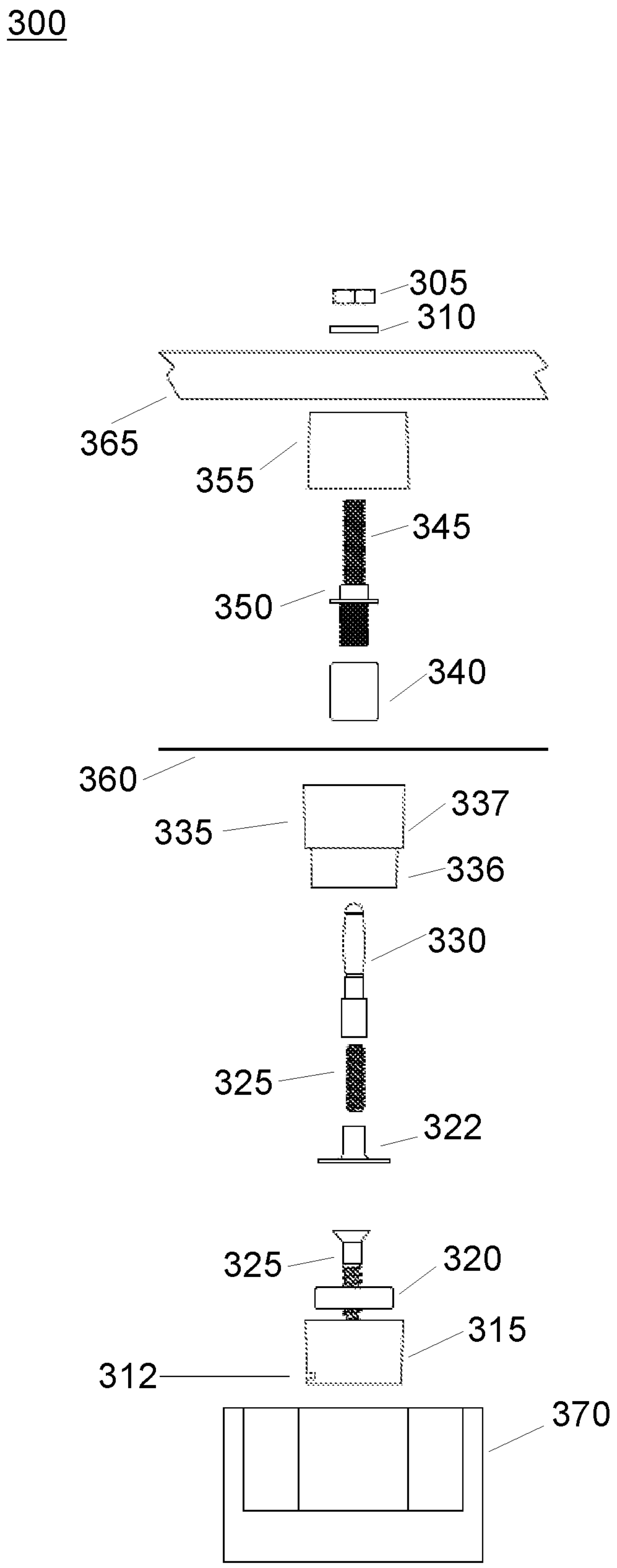
FIG. 3 illustrates a magnetic standoff system in accordance with some embodiments.

Referring now to FIG. 3, an embodiment of a fastener 300 is illustrated. The fastener 300 may comprise a nut 305 a washer 310, a solder tab 312, a first cup 315, a first magnet 320, a first rod 325, a first nut 322, a second rod 325, a plug 330, a standoff body 335 comprising a first portion 336 and a second portion 337, a spacer 340, a plug-in contact point 345, a nut 350, and a second standoff body 355.

The fastener 300 may function as a standoff and may utilize a same magnet cup for attachment to a sign 370 or overlay. Fastener 300 may also utilize (i) a plug 330 that is part of the standoff body 335 and (ii) a plug-in contact point 345 that is part of the second standoff body 355 where the plug 330 is to connect to the plug-in contact point 345 which may be mounted to the backer wall 365 or panel. Like the fastener of FIG. 2, fastener 300 may be used in the case where the backer wall or panel is covered in a cloth 360 or fabric but, in this embodiment, the plug 330 may "punch" through the cloth/fabric and may be physically and electrically coupled to the plug-in contact point 345. As stated above, the fabric may comprise SEG and the plug 330 may conduct power to lights in the sign or overlay.

In use, the fastener 300 may be similar to fastener 100 and fastener 200 in how it connects to a sign or overlay. However, to connect to a fabric covered wall, fastener 300 utilizes (i) the plug 330 that is part of the standoff body 335 and (ii) the plug-in contact point 345 that is part of the second standoff body 355 as described above.

In some embodiments, and in cases where supporting a greater load is needed, the plug 330 may comprise a threaded rod that screws into the contact point 345. In this embodiment, the contact point 345 may be threaded to receive the threaded plug 330. In use, the threaded plug 330 may be screwed into the contact point 345 with the fabric located between the threaded plug 33 and the contact point 345.

Figure 7:
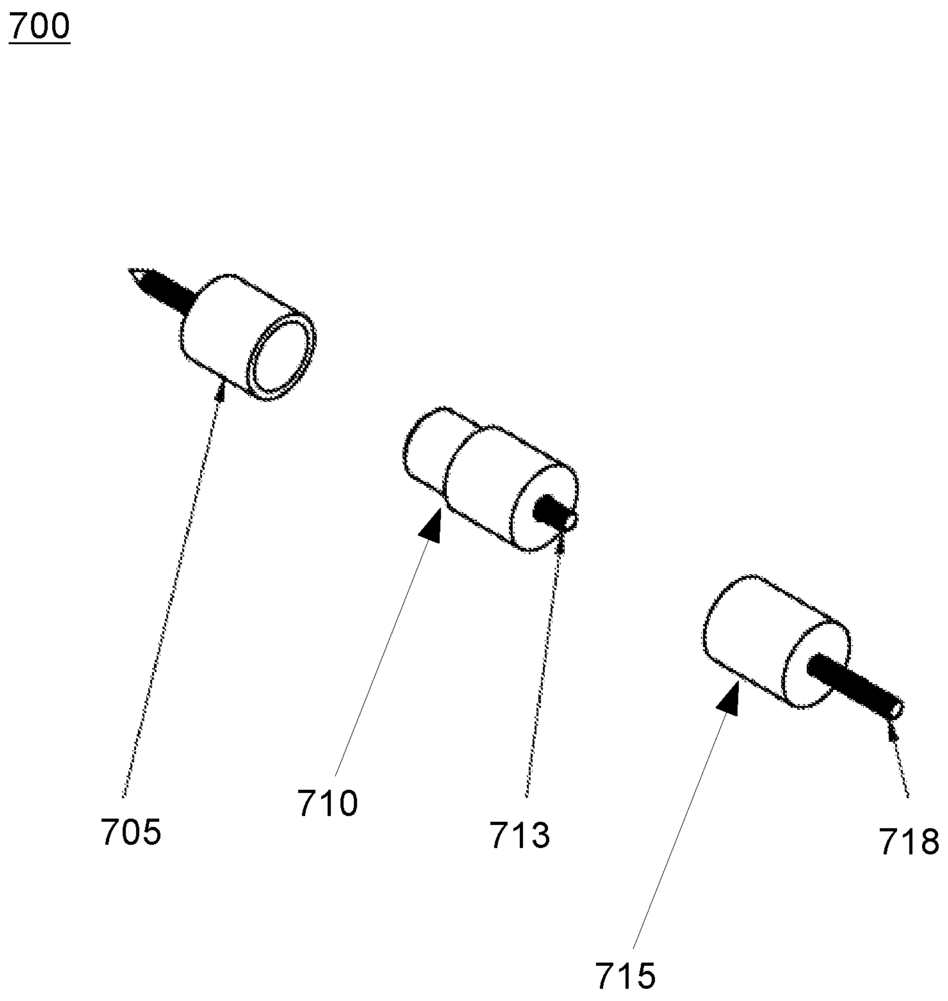
FIG. 7 illustrates a magnetic standoff system in accordance with some embodiments.

Referring now to FIG. 7, an embodiment of a fastener 700 is illustrated. The fastener 700 may function as a standoff. The fastener 700 may comprise a first cup 715 comprising a first rod 718. The first cup 715 (via the first rod 718) may be coupled to a wall. A standoff body 710 may be coupled to the first cup 715 via second rod 713. The standoff body 710 may be coupled to a second cup 705. The second cup 705 may be coupled to a sign via a third rod. In the illustrated embodiment, the second cup 705 comprises a magnet while the standoff body 710 and the first cup 715 do not comprise a magnet. In this regard, the standoff body 710 (e.g., a middle connector) may be coupled to the first cup 715 (e.g., a first portion) and magnetically coupled to the second cup 705 (e.g., a second portion) where the first portion comprises a first rod 718 to be removably coupled to the wall.

Figure 8:
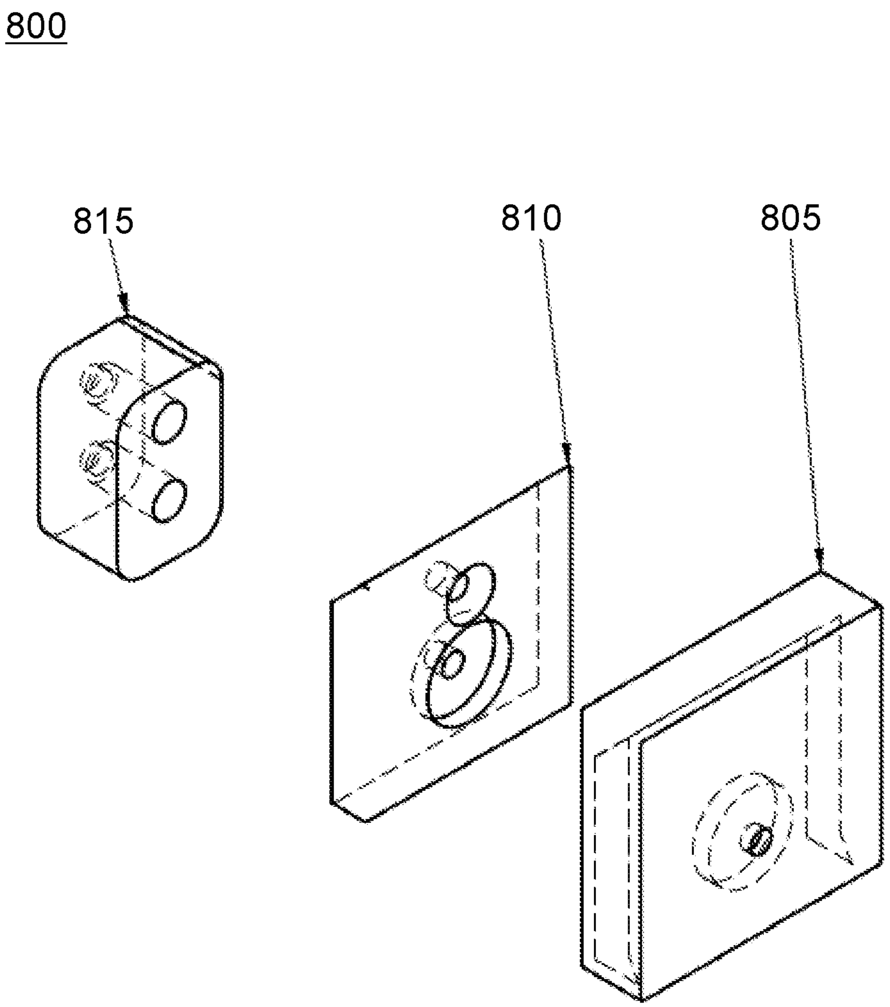
FIG. 8 illustrates a magnetic standoff system in accordance with some embodiments.
Figure 9:
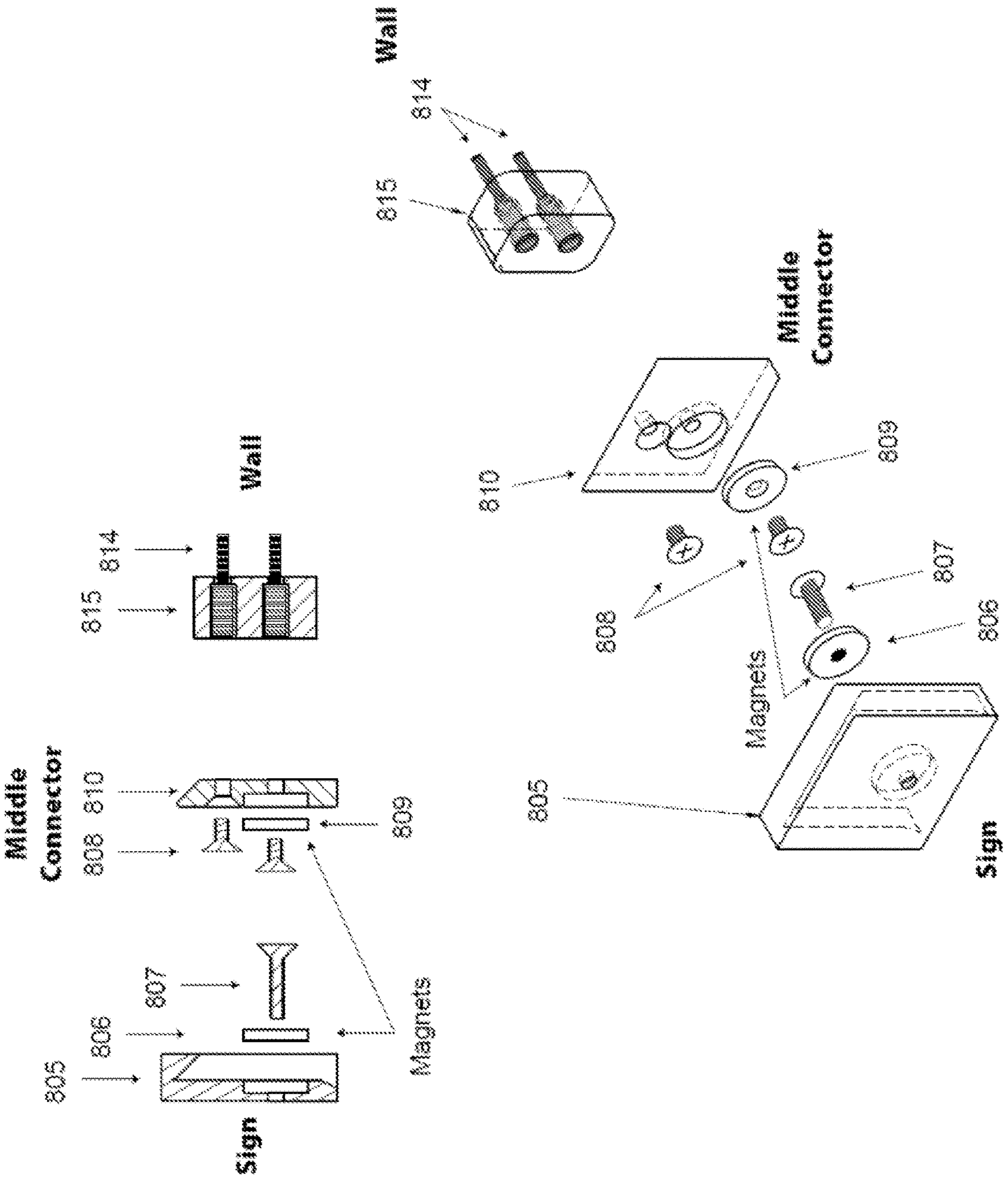
FIG. 9 illustrates a magnetic standoff system in accordance with some embodiments.

Referring now to FIG. 8 and FIG. 9, an embodiment of a fastener 800 is illustrated. The fastener 800 may function as a standoff. The fastener 800 may comprise a second portion 805 that may be fastened to a sign via one or more rods 807 (e.g., screws, bolts, nails, etc.). The second portion 805 may comprise a magnet 806. A standoff body 810 may also comprise a magnet 809 and may be coupled to the first portion 815 via one or more rods 808. Magnets 809 may also be used to couple the standoff body 810 to the second portion 805. The standoff body 810 may be coupled to the second portion 805. The first portion 815 may be coupled to a wall via one or more rods 814. In the illustrated embodiment, the standoff body 810 (e.g., a middle connector) may be coupled to the first portion 815 and magnetically coupled to the second portion 805.

This written description uses examples to disclose multiple embodiments, including the preferred embodiments, and also to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A fastener comprising:
- a first portion to be coupled to a wall;
- a second portion to be coupled to signage; and
- a middle connector to be (i) coupled to the first portion and (ii) magnetically coupled to the second portion, wherein the first portion comprises a first rod to be removably coupled to the wall.

2. The fastener of claim 1, wherein the signage comprises lighting.

3. The fastener of claim 2, wherein the first portion is connected to a power supply, and the second portion is electrically coupled to the lighting, and wherein electricity is to flow from the power supply through the middle connector to power the lighting.

4. A fastener comprising:
- a first portion to be coupled to a wall;
- a second portion comprising a magnet and to be coupled to signage; and
- a middle connector to be (i) coupled to the first portion and (ii) magnetically coupled to the second portion, wherein electricity is to flow through the middle portion to power one or more lights.

5. The fastener of claim 4, wherein the first rod is threaded.

6. The fastener of claim 4, wherein the signage comprises lighting.

7. The fastener of claim 6, wherein the first portion is connected to a power supply and the second portion is electrically coupled to the lighting, and wherein electricity is to flow from the power supply through the middle connector to power the lighting.

* * * * *